United States Patent [19]
Hinton

[11] Patent Number: 5,923,407
[45] Date of Patent: Jul. 13, 1999

[54] TECHNIQUE FOR AUTOMATICALLY ACTIVATING AND DEACTIVATING THE AVAILABILITY OF IMAGE BORDERS AS A FUNCTION OF TIME

[75] Inventor: Timothy Hinton, Rochester, N.Y.

[73] Assignee: Eastman Kodak Company, Rochester, N.Y.

[21] Appl. No.: 08/995,737

[22] Filed: Dec. 22, 1997

[51] Int. Cl.[6] .............................. G03B 27/52; G03B 27/32
[52] U.S. Cl. ................................................ 355/40; 355/27
[58] Field of Search ........................... 355/27–29, 40–43, 355/77, 133; 396/332; 358/450, 453, 500, 487; 348/222, 589, 96; 395/100, 147, 157; 345/113, 435

[56] References Cited

U.S. PATENT DOCUMENTS

| | | | |
|---|---|---|---|
| 4,437,092 | 3/1984 | Dean et al. | 340/703 |
| 4,568,981 | 2/1986 | Beaulier | 358/183 |
| 4,698,666 | 10/1987 | Lake, Jr. et al. | 358/22 |
| 4,823,120 | 4/1989 | Thompson et al. | 340/703 |
| 4,827,344 | 5/1989 | Astle et al. | 358/183 |
| 4,961,114 | 10/1990 | White | 358/183 |
| 4,994,914 | 2/1991 | Wiseman et al. | 358/160 |
| 5,165,012 | 11/1992 | Crandall et al. | 395/100 |
| 5,175,813 | 12/1992 | Golding et al. | 395/157 |
| 5,293,235 | 3/1994 | Guede et al. | 348/586 |
| 5,305,108 | 4/1994 | Trytko | 348/584 |
| 5,388,202 | 2/1995 | Squires et al. | 395/119 |
| 5,448,307 | 9/1995 | Gelissen et al. | 348/584 |
| 5,459,529 | 10/1995 | Searby et al. | 348/586 |
| 5,579,028 | 11/1996 | Takeya | 345/115 |
| 5,600,412 | 2/1997 | Connors | 399/81 |
| 5,675,400 | 10/1997 | Stephenson, III | 355/40 |
| 5,790,165 | 8/1998 | Kuboki et al. | 347/251 |
| 5,796,945 | 8/1998 | Tarabella | 395/200.9 |
| 5,799,219 | 8/1998 | Moghadam et al. | 396/319 |

*Primary Examiner*—Safet Metjahic
*Assistant Examiner*—Hung Henry Nguyen
*Attorney, Agent, or Firm*—Mark G. Bocchetti

[57] ABSTRACT

A method for use with a system that combines an input image with a border selected from a storage medium of borders to provide a composite image that is hard copy ready incorporating the steps of, providing each border with an expiration date and storing the borders and their respective expiration dates in the system's files. Each border with an associated expiration date is automatically deactivated on its expiration date. That in turn makes available for selection only those borders that have not yet been deactivated.

6 Claims, 3 Drawing Sheets

TECHNIQUE FOR AUTOMATICALLY ACTIVATING AND DEACTIVATING THE AVAILABILITY OF IMAGE BORDERS AS A FUNCTION OF TIME

FIELD OF THE INVENTION

This invention relates generally to the field of digital imaging, and in particular to the production of photographic mementos having borders. More specifically, the invention relates to an automated system for automatically changing the border that is combined with a digital image at the expiration of a preselected time.

BACKGROUND OF THE INVENTION

A Kodak Image Magic Print Station (KIMPS) allows a customer to make prints from their original photographs or some other input source (e.g. negative, slide, photoCD, etc.). To enhance the finished product and to add a personal touch, the KIMPS allows the customer to combine their image with a design border. For promotional purposes retailers may want to install seasonal (i.e. Christmas) or some local/regional event theme designed borders on their systems. After the season or event has changed or expired, the retailer has to manually delete the specific theme designed borders from the system. This is inefficient because there might be an indeterminate amount of time between the time, the season, or event is over and the time the designed borders are removed from the system. A technique for automatically activating and deleting the designed borders after a fixed period of availability is needed.

The present invention allows designed borders to be controlled by an availability date. Before the availability date, such borders can be installed on the system, but they cannot be used in image editing. Once the availability date has arrived or has passed, and before the termination date has arrived, the borders may be installed, removed, and used in image editing. When the termination date arrives, the expired borders will be removed from the system automatically.

SUMMARY OF THE INVENTION

The present invention is directed to overcoming one or more of the problems set forth above. Briefly summarized, according to one aspect of the present invention there is provided a method for use with a system that combines an input image with a border selected from a storage medium of borders to provide a composite image that is hard copy ready, comprising the steps of:

a) providing each border with an expiration date;

b) storing the borders and their respective expiration dates in the system file;

c) automatically deactivating borders on their expiration date; and d) making available for selection only those borders that have not yet been deactivated.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

retailer does not have to manually delete the borders from the system;

borders can be loaded on system based upon an event for season and automatically deleted at the end of the season; and retailer does not make the mistake of deleting the wrong borders.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
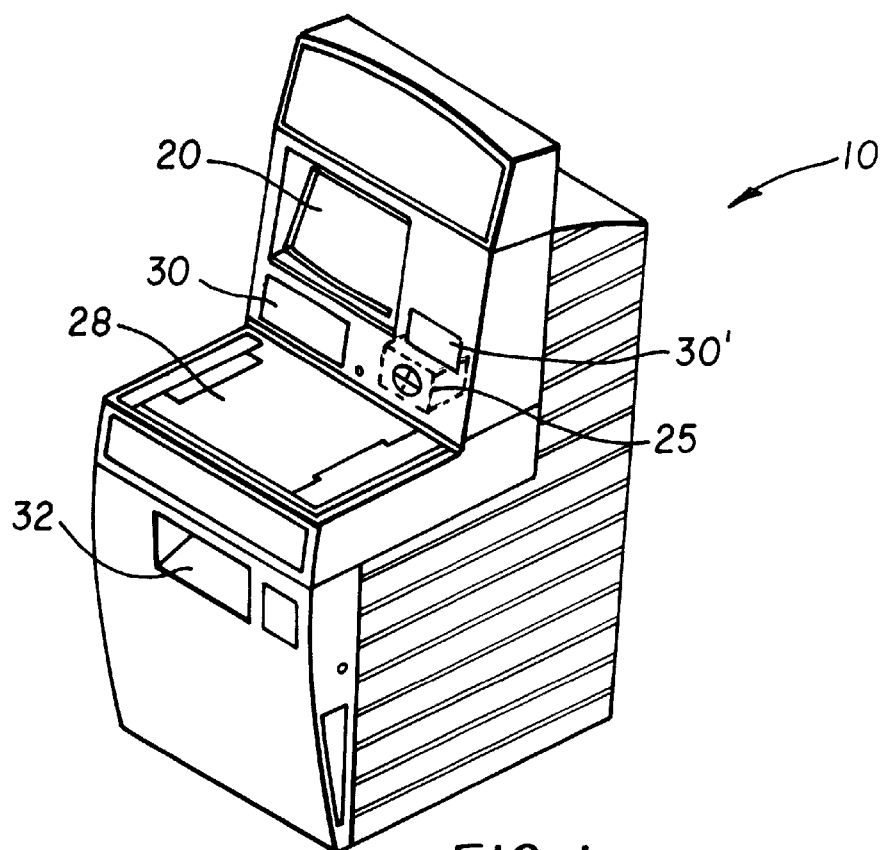
FIG. 1 is a perspective view of a Kiosk type system incorporating the feature of providing a border that is automatically activated at a set start time and deactivated at a set expiration time.

In the present invention, design borders are loaded onto a digital image editing system and by selection are used for image editing if the current date is within the design border's availability date. After this date the design border is automatically deleted from the system. The technique is as follows:

Referring to FIG. 1, a system on which the present invention may be implemented is shown as system 10. The system is comprised of a display 20 connected to an internal processor 25 which incorporates input devices such as a scanner 28 and other removable storage reading devices 30, such as a CD ROM, floppy drive, and digital camera card reader 30'. Output devices such as a printer 32 or other removable writing storage devices operate to provide a hard copy or a means for later obtaining a hard copy of the composed image. Although not specifically shown, it is within the teachings of the present invention that the composed image may be outputted to network devices for transmission to remote locations. In a like manner the input image may be received from a remote location and processed in the same manner as an image that is received locally.

Figure 2:
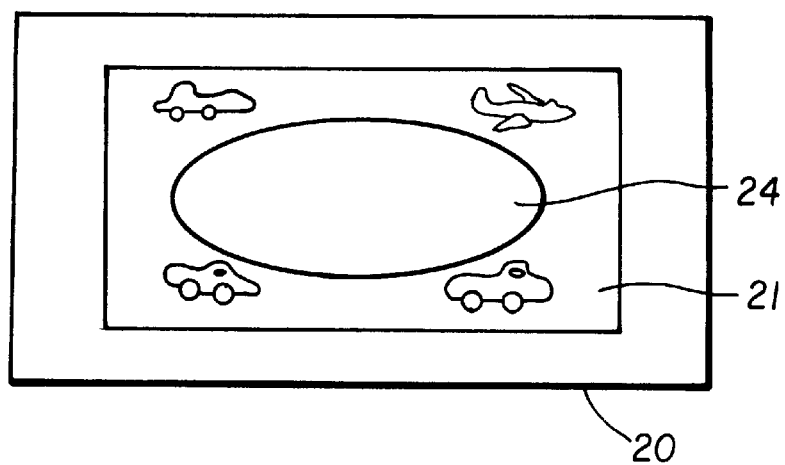
FIG. 2 is a representation of the system display of FIG. 1 displaying an image with a border.

Referring to FIG. 2, in operation, an image 24 is inputted into the system 10 and displayed on the display 20. The customer then accesses thumbnail files 22 of available borders (see screen of FIG. 3) and selects one for viewing with the displayed image 24. Once the composition of border 21 and image 24 are as desired, the customer selects whether the composition is to be printed or edited further.

Figure 3:
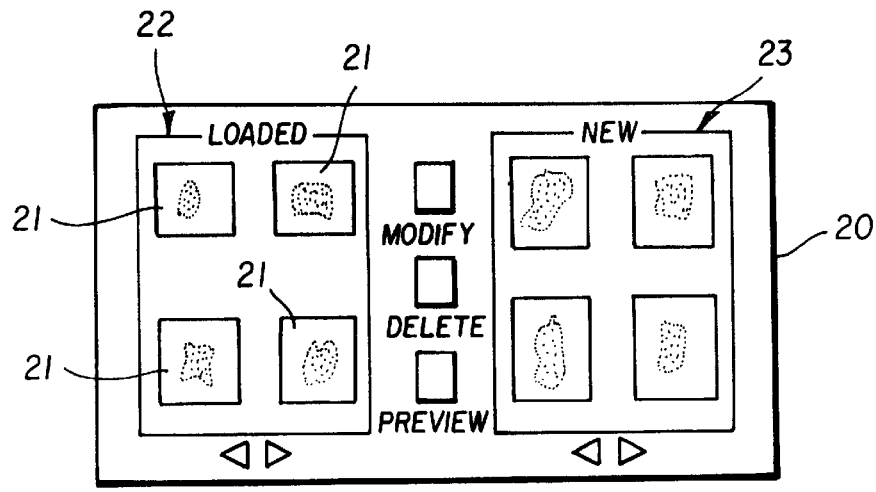
FIG. 3 is a displayed system menu display illustrating thumbnail images of the borders already loaded in the system of FIG. 1 and the borders that are new to the system.
Figure 4:
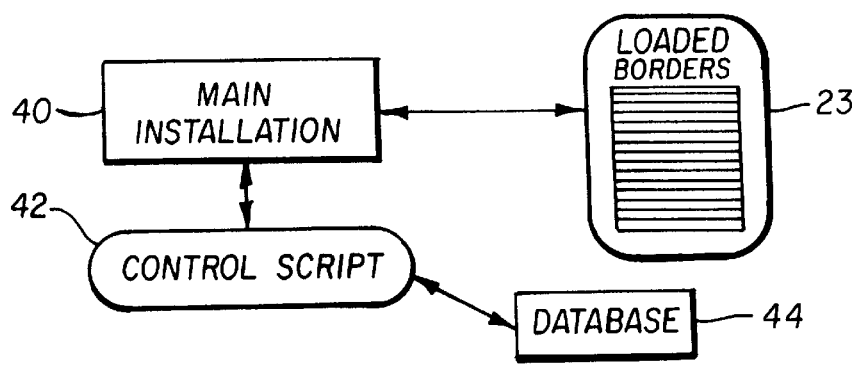
FIG. 4 is a functional diagram illustrating the checking of borders that are loaded on the system of FIG. 1.

Referring now to FIGS. 3 and 4, implementation of the invention is commenced with an installation function 40 that loads new borders 23 and their associated accessibility dates onto the system 10. This installation function 40 allows the new borders 23 to be added, modified, or deleted from the system. Borders 21 that have been previously loaded onto the system 10 are checked to determine their expiration dates. If a border is expired it is removed form the system at this time A control script 42 that is loaded onto the system 10 is used to access a database 44. If a border is expired it is removed from the system and its entry is removed from the database 44. If a border is valid or not yet available it will be displayed as illustrated in FIG. 3 when technician is loading new borders. Thereafter only valid borders are displayed to a user.

Figure 5:
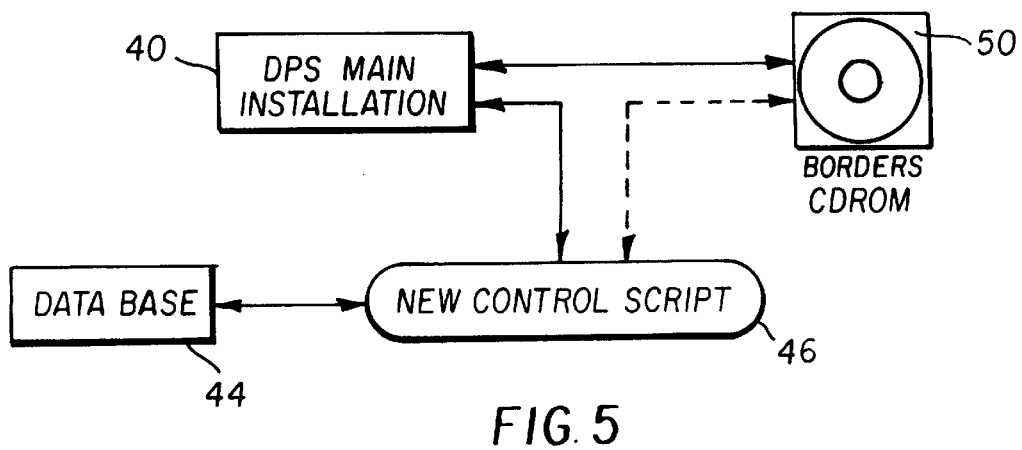
FIG. 5 is a functional diagram illustrating the reconciling of borders and their associated expiration time information that are already loaded on the system with those that are to be loaded onto the system.

Referring to FIG. 5, new borders arriving at the system 10 on a CDROM 50 are checked for time expiration and a new control script 46. If a new control script 46 is found, a reconcile function is executed. The reconcile function is a process where the new control script is executed with a merge option. The merge option tells the control script 46 to reconcile the old (loaded borders) database format in the database 44 to the new database format read from the CDROM 50. The new borders' names are then loaded into the installation function 40. For each border loaded, it is checked against the database on the CDROM to verify it is still a valid border. The new control script 46 that is on the CDROM (if there is one on the CDROM), is used to access the database 44. If a border on the CDROM has a past due expiration date it will not be loaded onto the system as a selection. If the border is valid or delayed, it will be loaded onto the system as a selection and will be available for adding to the borders on the system.

Figure 6:
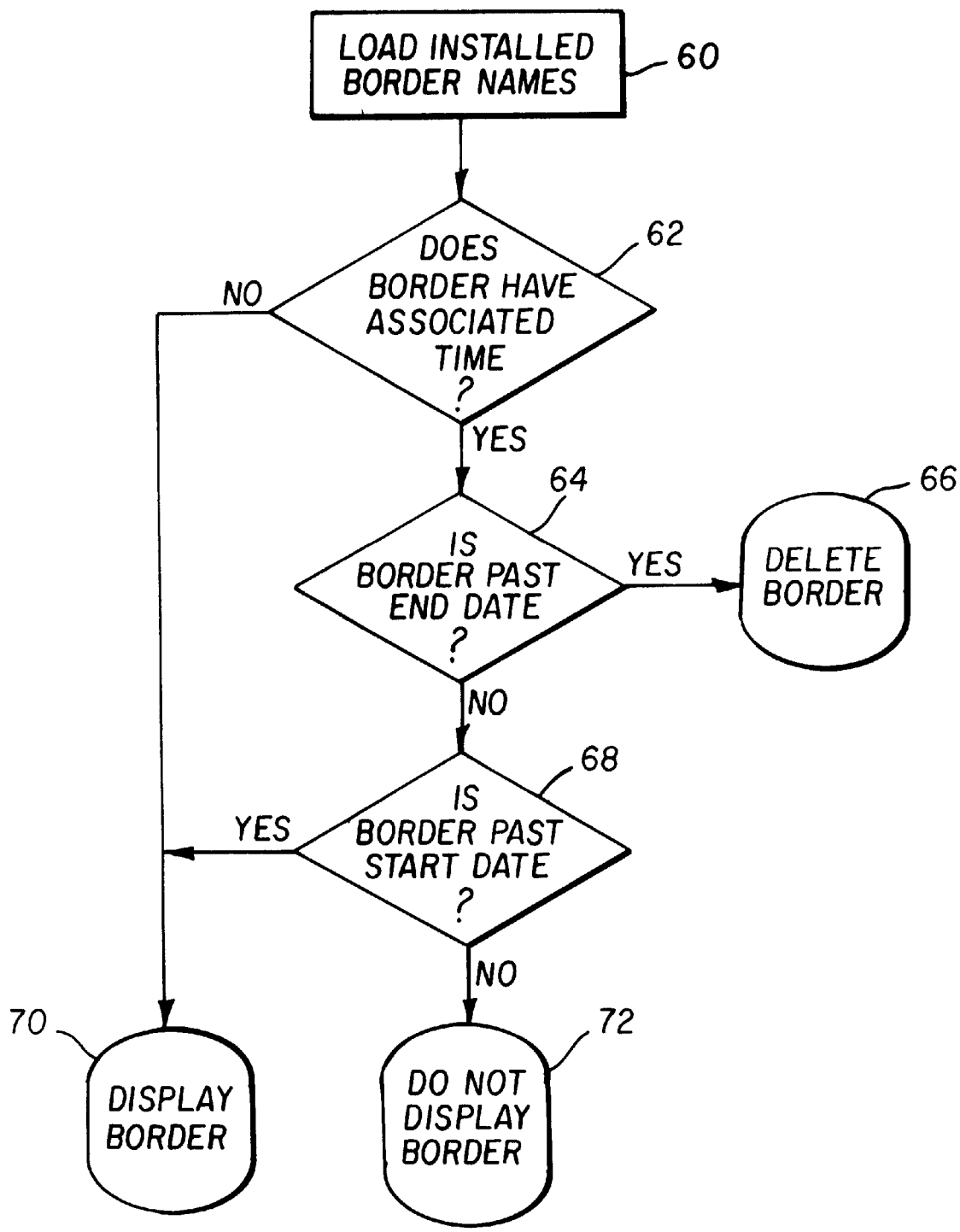
FIG. 6 is a flow chart illustrating the function steps that the system follows when implementing the present invention.

Referring to FIG. 6, in summary, composition is the function of composing an image with a border. When entering the composition function, the borders on the system are checked to verify that they have an associated time attribute that is still valid. If any expired borders are found on the system they are deleted. If the borders are not past the end date the start date is checked. If the date of checking is past the start date, the border is displayed in the selection list, otherwise it is not displayed.

More specifically, in block 60 the operation represented is checking the names of the borders that are loaded on the system. In decision block 62 each border is checked to determine if the border has an expiration time associated therewith. If it does not, the border is a displayable border per block 70. If the border does have an associated time, the program advances to decision block 64 wherein a determination is made as to whether the time has expired or not. If the time has expired, the border is deleted per action block 66. If the time has not expired, the program advances to block 68 to determine if the start date has been met. If it has, the border is displayable per block 70. If the start date has not been met, the border is not displayable per block 72.

The invention has been described with reference to a preferred embodiment; However, it will be appreciated that variations and modifications can be effected by a person of ordinary skill in the art without departing from the scope of the invention.

PARTS LIST:

system
display
border
thumbnail files
new borders
image
processor
scanner
removable storage reading devices
digital camera card reader
printer
installation
control script
database
new control script
CDROM
block—load/check names of borders
decision block—does border have associated time?
decision block—s border past end date?
block—delete border
block—check border start date
block—display border
block—do not display border

What is claimed is:

1. A method for use with a system that combines an input image with a border selected from a storage medium of borders to provide a composite image that is hard copy ready, comprising the steps of:

a) providing each border with an activation date;

b) storing the borders and their respective activation date in the system file;

c) automatically activating borders on their activation date; and d) making available for selection only those borders that have been activated.

2. A method for use with a system that combines an input image with a border selected from a storage medium of borders to provide a composite image that is hard copy ready, comprising the steps of:

a) providing each border with an expiration date;

b) storing the borders and their respective expiration dates in the system file;

c) automatically deactivating borders on their expiration date; and d) making available for selection only those borders that have not yet been deactivated.

3. A method for use with a system that combines an input image with a border selected from a storage medium of borders to provide a composite image that is hard copy ready, comprising the steps of:

a) providing each border with an activation date and an expiration date;

b) storing the borders and their respective activation date and expiration dates in the system file;

c) automatically activating borders on their activation date and deactivating borders on their expiration date; and d) making available for selection only those borders that have been activated and that have not yet been deactivated.

4. The method according to claim 1 and further comprising the step of displaying all of the borders that are available for selection.

5. An image print station of the type that receives an input image and displays the input image with a border that is selectable from a file of stored borders, the improvement comprising:

means for associating an expiration time for each of the stored borders; and means for denying access to a border whose associated time has past thereby automatically controlling which borders are selectable for use at the print station.

6. The image print station according to claim 5 and further comprising a means for associating an activation time for each of the stored borders so as to further control the access to stored borders.

* * * * *